Feb. 18, 1930.  B. A. PETERSON  1,747,734
WARPER CLOCK
Filed Oct. 18, 1923  4 Sheets-Sheet 1

Inventor:-
B. A. Peterson,
By Chritstal Parker Calvin
Attys.

Feb. 18, 1930. B. A. PETERSON 1,747,734
WARPER CLOCK
Filed Oct. 18, 1923 4 Sheets-Sheet 4

Inventor.
B. A. Peterson,
By Chandahl Parker Carlson
Attys

Patented Feb. 18, 1930

1,747,734

UNITED STATES PATENT OFFICE

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS

WARPER CLOCK

Application filed October 18, 1923. Serial No. 669,205.

The beam of a loom is filled with yarn at the slasher, yarn from six or eight warper beams being simultaneously wound upon the loom beam. In order to avoid waste it is desirable that all the warper beams in the slasher shall unwind or run out at the same time. To attain this result each warper is provided with a "clock" or measuring device adapted to cause stoppage of the warper when a predetermined length of yarn has been wound upon the warper beam. Clocks of the prior art have been so constructed that it was easily possible to make an error in setting the clock.

The object of this invention is to provide means to prevent errors in setting the clock, to provide improved means to prevent mischievous or accidental displacement of the indicator, and to provide improved means to stop the warper to permit the insertion of a lease when any predetermined length of yarn has been wound upon the warper beam.

In the accompanying drawings, Figs. 20 to 24 inclusive, illustrate a warper clock having means for stopping the warper at predetermined intervals for the insertion of a lease.

While warper clocks embodying the present invention are adapted for use with beam warpers and ball warpers of various types and makes, I have herein shown it as applied to a Barber-Colman high-speed beam warper. One form of said warper is shown in my Patent No. 1,672,470, dated June 5, 1928.

The clock comprises means for closing an electric circuit when a predetermined amount of yarn has been wound upon the warper beam, said circuit including means for stopping the warper. The circuit is closed by means of a contact which is slowly advanced toward the closed-circuit position by means of a screw which is positively driven by the warper.

Figure 13:
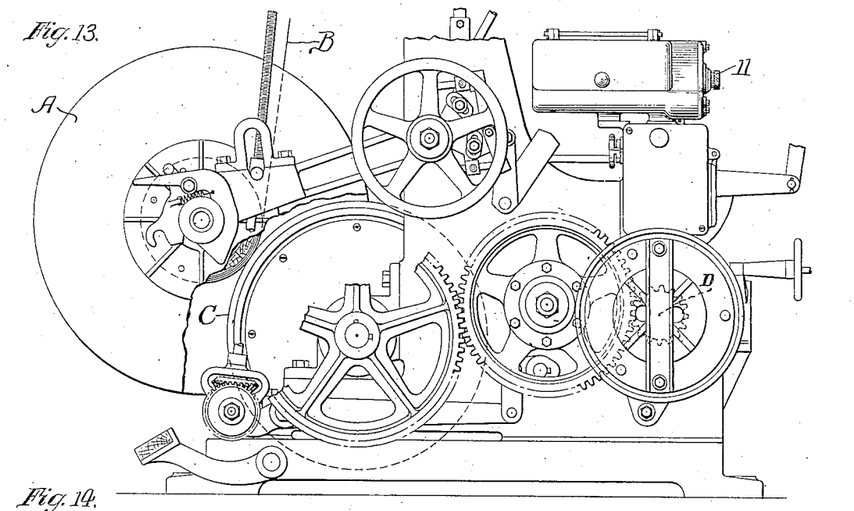
Fig. 13 is a fragmental end elevation of a beam warper showing the warper clock applied thereto.
Figure 14:
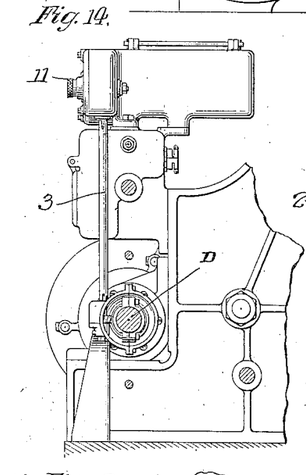
Fig. 14 illustrates the opposite side of the warper clock and shows the manner in which the clock is driven from the main drive shaft of the warper.

Referring now to Fig. 13, A is the beam upon which the yarn B is being wound. The yarn mass wound upon the beam A rests upon a friction drum C which is geared to the main shaft D of the warper. In the construction herein shown the clock is driven from the shaft D by means of a worm 1 on said shaft meshing with a spiral gear 2 on a shaft 3. To the upper end of the shaft 3 is fixed a worm 4 (Fig. 2) which meshes with a spiral gear 5 mounted in the clock casing. Rigid with the gear 5 is a spur gear wheel 6 meshing with a change gear 7 supported by a bracket 8. The bracket 8 is pivotally mounted upon the axis of the before-mentioned screw and is secured in adjusted position by means of a screw 9. The change gear 7 meshes with a change gear 10 which is removably secured to a sleeve 11 (Fig. 1) by means of a pin 12 and a nut 13. The sleeve 11 is rotatably and slidably mounted in an opening 14 in a cover plate 15 secured to the end of the clock casing.

Figure 1:
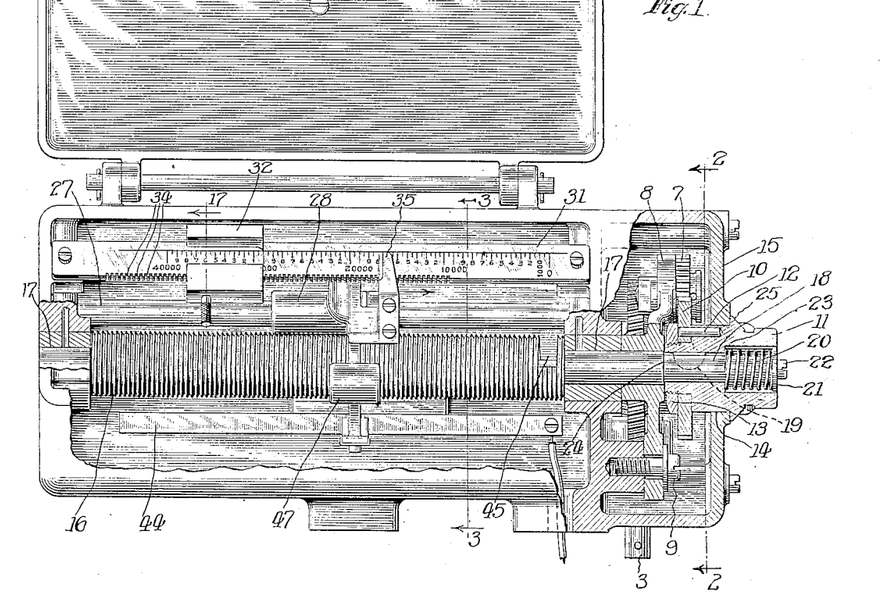
Figure 1 is an elevation, with certain parts in section, illustrating a warper clock embodying the features of my invention.
Figures 2, 3:
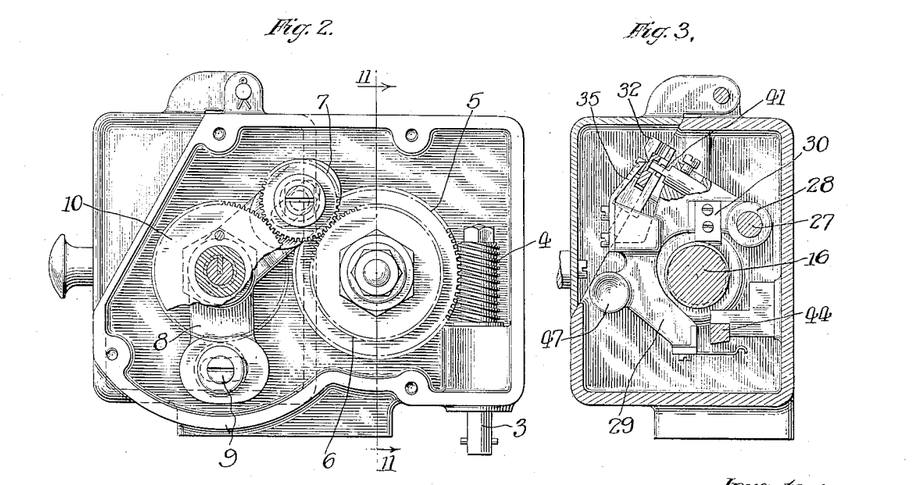
Fig. 2 is a view taken in the plane of line 2—2 of Fig. 1.
Fig. 3 is a section on line 3—3 of Fig. 1, the indicator being shown in operative position.
Figure 4:
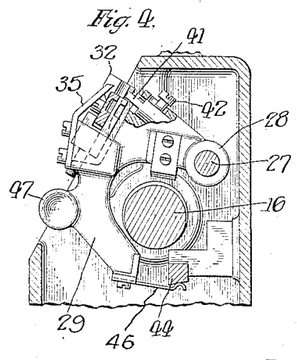
Fig. 4 is a view similar to Fig. 3 but showing the indicator slid back to starting position and ready to be dropped down into engagement with the driving worm.

The screw 16 hereinbefore referred to is journalled in bearings 17 in the clock casing, said screw being rigid with a shaft 18 on which the change gear bracket 8 is pivoted, said shaft also extending through the sleeve 11. The sleeve 11 is slidably but non-rotatably connected to the shaft 18 by means of a spline 19. The bore of the sleeve 11 is enlarged to receive a coiled expansive spring 20 which surrounds the shaft 18 and bears at its outer end against a disk 21 which is secured to the end of said shaft by means of a screw 22. The inner end of the spring 20 bears against an annular shoulder 23 within the sleeve 11 and thus serves normally to hold the sleeve against an annular shoulder 24 on said shaft, the change gear 10 being then in mesh with the change gear 7. The outer end of the sleeve 11 is knurled and carries a graduated flange 25 (Fig. 12) adapted to cooperate with a datum mark 26 on the cover plate 15.

Figures 15, 16, 18, 19:
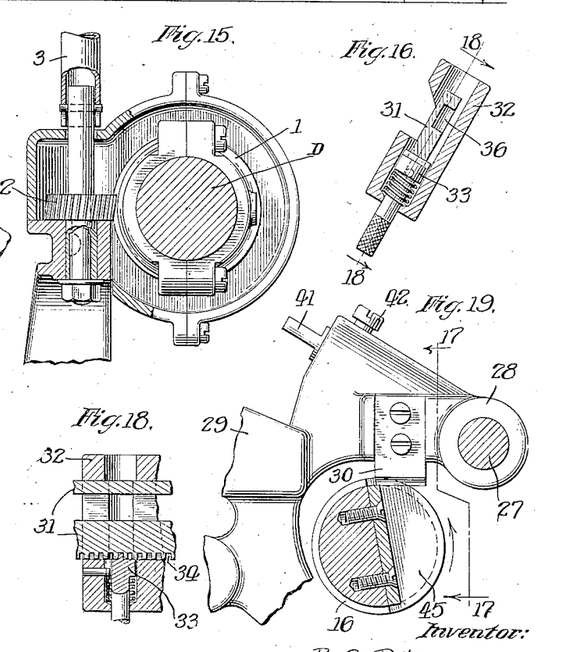
Fig. 15 is a fragmental sectional view of the drive for the warper clock.
Fig. 16 is a sectional detail of an adjustable stop block comprising the warper clock.
Fig. 18 is a view taken in the plane of line 18—18 of Fig. 16.
Fig. 19 is a fragmental side view of the slide and its driving screw.
Figure 17:
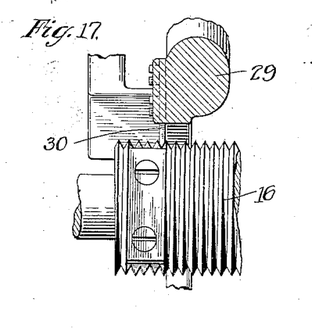
Fig. 17 is a view taken in the plane of line 17—17 of Fig. 19.
Figure 20:
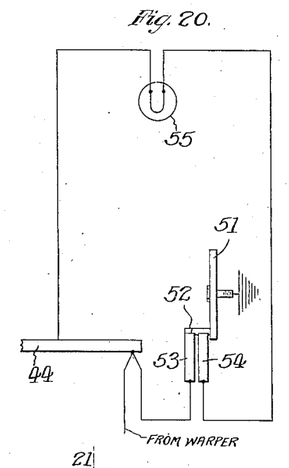
Fig. 20 is an electrical diagram.
Figure 21:
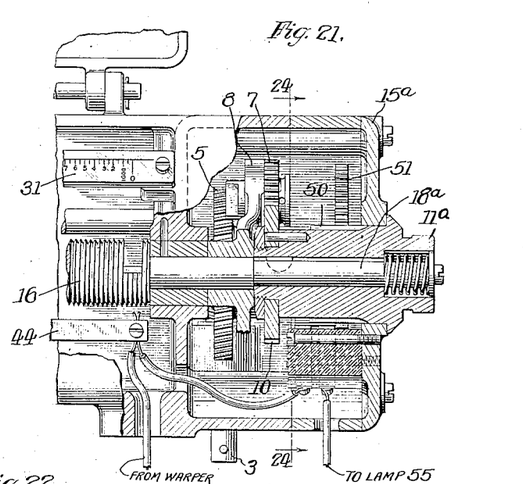
Fig. 21 is a fragmental front view with certain parts shown in section in the plane of line 21—21 of Fig. 22.
Figure 22:
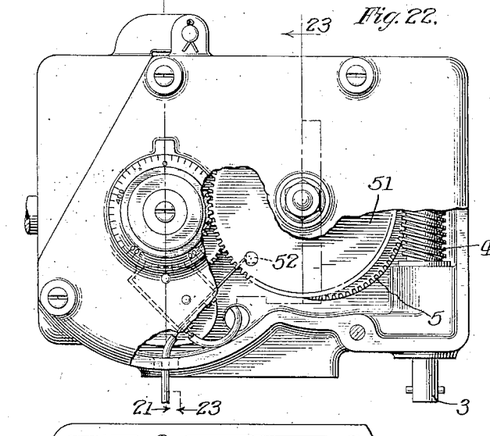
Fig. 22 a fragmental end view.
Figure 23:
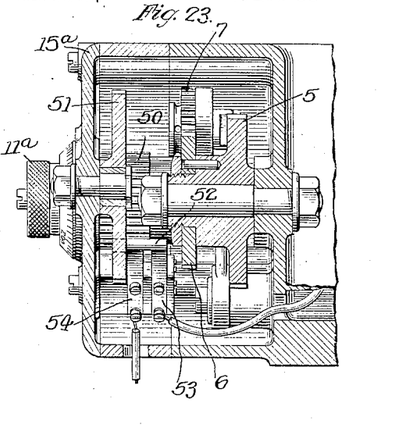
Fig. 23 a section on line 23—23 of Fig. 22, and Fig. 24 a section on line 24—24 of Fig. 21.

A guide rod 27 (Fig. 3) extends parallel with the screw 16 within the clock casing. On this guide rod is slidably mounted the hub 28 of a slide 29. To the slide 29 is secured a tooth or plate 30 adapted to engage the thread of the screw 16. The screw is revolved in the direction to move the slide 29 toward the gear end of the clock. The means for determining the starting point of the slide 29 comprises a graduated bar 31 secured within the clock casing and extending parallel with the screw 16 and the guide rod 27. On the graduated bar 31 is slidably mounted a stop block 32, said block being arranged to be locked in position upon the graduated bar 31 by means of a spring-pressed plunger 33 (Figs. 16 and 18) arranged to engage locking notches 34 in the lower edge of the graduated bar. The plunger 33 is provided with a knurled lower end constituting the handle for operating the plunger and for sliding the block along the graduated bar. To the slide 29 is secured an indicator finger 35 arranged to overlie the graduated side of the bar 31 and adapted to determine the starting position of the slide 29 by contact with one end of the stop block 32.

Figures 7, 8, 9, 10, 11, 12:
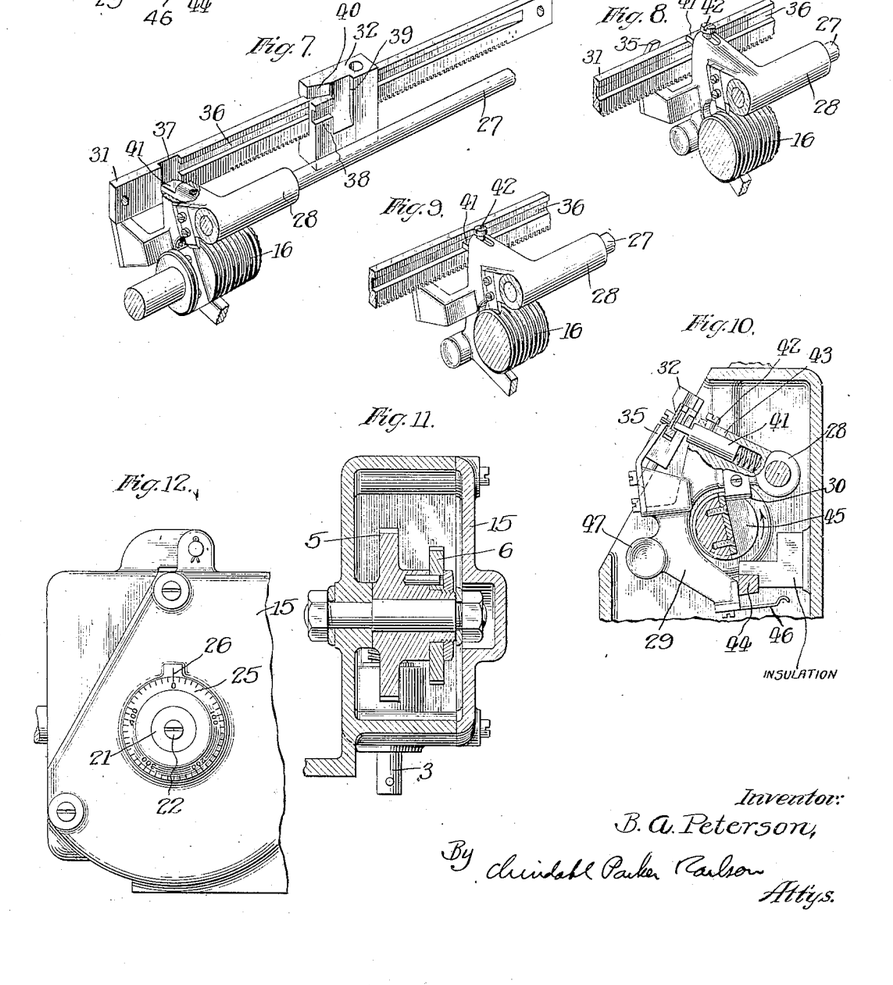
Fig. 7 is a perspective view showing the position of the indicator when acting to stop the warper.
Fig. 8 is a perspective view showing the indicator being returned to starting position.
Fig. 9 represents the indicator as being slowly advanced during the operation of filling the beam.
Fig. 10 is a sectional view showing the parts in the position represented in Fig. 7.
Fig. 11 is a section on the line 11—11 of Fig. 2.
Fig. 12 is a fragmental view taken from the right-hand end of Fig. 1.

Upon reference to Fig. 7 it will be noted that there is a longitudinal groove 36 in the rear side of the graduated bar 31. The groove 36 communicates at one end with a transverse groove 37. The groove 37 extends to the upper edge of the bar. In the rear side of the stop block 32 is a groove 38 that extends parallel with the groove 36 and communicates at one end with a transverse groove 39 in the stop block. One corner of the stop block 32 is cut away to form an inclined surface or guideway 40 which extends from the upper edge of the graduated bar 31 to the groove 39.

The slide 29 is provided with a spring-pressed projection or plunger 41, the outer end of which is adapted to move through the transverse groove 37 and along the upper edge of the bar 31 and the inclined guideway 40, down through the transverse groove 39, and through grooves 38 and 36. The plunger 41 carries a screw 42 (Fig. 10) that extends through an elongated opening 43 in the slide 29.

An electric contact bar 44 (Fig. 1) is mounted within the clock casing and insulated therefrom, said contact bar extending parallel with the screw 16. This bar is connected into a normally energized circuit which forms part of the means for stopping the warper.

The screw 16 is cut away near the driving end thereof to form a notch 45 (Figs. 1 and 10). When the indicator 35 reaches the zero mark on the graduated bar 31, the tooth 30 on the slide 29 drops into the notch 45, the plunger 41 descending into the transverse groove 37 (as shown in Fig. 7), and the lower end of the slide 29 making contact with the bar 44 (as shown in Fig. 10), thereby closing a circuit to ground, and causing the warper to be automatically stopped.

On the lower end of the slide 29 is a contact spring 46 adapted to engage the contact bar 44 in certain positions of the slide 29. Said slide is provided with a handle portion 47.

Figures 5, 6:
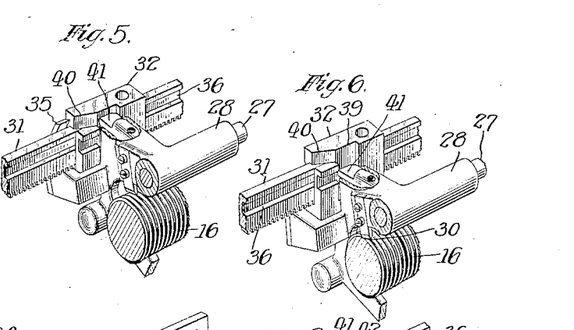
Fig. 5 is a perspective view showing the parts in the position represented in Fig. 4.
Fig. 6 is a perspective view showing the indicator dropped down into engagement with the driving worm.

Assuming that the warper is in readiness to fill a new beam, and that the indicator is in the position illustrated in Figs. 7 and 10, the operation is as follows: The operator lifts the slide 29 until the projection 41 is above the upper edge of the graduated bar 31, and then slides the indicator to the left until the indicator finger 35 stops against the end of the stop block 32. As the indicator finger approaches the stop block the projection 41 engages the inclined surface 40 and is thereby forced back until it enters the transverse groove 39, the indicator finger 35 being at that time in contact with the stop block 32 (see Fig. 5). The operator then drops the slide 29, the tooth 30 entering the thread of the screw 16, as shown in Fig. 6, and the projection 41 being then in line with the groove 32. The slide 29 is then out of engagement with the contact bar 44, as will be understood from Fig. 3. The operator then sets the warper in operation, the screw 16 being driven through its gear connection with the friction drum C.

After the projection 41 has entered the groove 38 or the groove 36, the slide 29 cannot be lifted to withdraw the tooth 30 from the screw 16, as the projection 41 travels close to the upper wall of said groove, and hence after the indicator has commenced to travel toward the right it cannot be accidentally or maliciously pushed one way or the other by taking hold of the slide 29. If at any time it should be necessary manually to change the position of the indicator, the operator may do so by a special maneuver, that is to say, by inserting the finger into the space above the graduated bar 31 and pushing back the screw 42 to retract the plunger 41 from the groove 36 or the groove 38, and then lifting the slide clear of the screw.

After the tooth 30 has dropped into the notch 45 of the screw, the slide 29 cannot be re-engaged with the screw without first returning the indicator finger 35 into contact with the stop block 32, or going through the maneuver above described.

After the slide 29 has been raised to place the plunger 41 on the upper edge of the bar 31, the warper cannot be restarted until the indicator 35 has been returned into engagement with the stop block 32, inasmuch as the ground-contact finger 46 engages the contact bar 44 while the plunger 41 rests upon the bar 31 and while said plunger is in engagement with the inclined guide surface 40. Not until the indicator finger 35 engages the stop block and the tooth engages the screw 16 can the warper be restarted, except by the special operation hereinbefore mentioned.

It will be seen that the indicator cannot be accidentally or maliciously displaced while the warper is running, and that the indicator cannot be improperly reset through carelessness or inadvertence.

The warper beam farthest back in the slasher creel is provided with a brake. The yarn unwound from said beam being under greater tension than the yarn from the other beams, will stretch somewhat; consequently if the same amount of yarn were wound on all the warper beams a hundred yards or so of yarn would remain on the beam farthest back when the others were completely unwound. In order that a special beam may be wound with less yarn thereon than the other beams, the clock is provided with the means hereinbefore described for adjusting the relation of the screw 16 to the drive. By first drawing out the sleeve 11 until the gear 10 is out of mesh with the gear 7, the sleeve 11 and the screw 16 may be turned sufficiently to advance the indicator a distance equivalent to the desired difference in length of yarn on the beams.

Owing to some accidental occurrence, it is occasionally necessary to remove a partly filled beam from a warper. The adjustable connection between the screw 16 and its driving means renders possible the winding of other partially filled beams to make up a complete set which will run out at the same time.

All the warpers supplying beams to a given slasher should produce beams containing the same length of yarn. The provision herein made for the use of change gears permits of adjusting the clocks of all the warpers so as to obtain the desired uniformity in the size of the beams.

Figs. 21 to 24 illustrate a modification whereby the clock is especially adapted for use on ball warpers, the clock being arranged to stop the warper whenever a predetermined length of yarn (say, one thousand yards) has been wound on the beam, in order to permit of inserting a lease.

Pinion teeth 50 formed in the sleeve 11$^a$ mesh with a spur gear wheel 51 rotatably mounted on the inner side of the cover plate 15$^a$. On the side of the gear 51 is a pin 52 adapted to bridge the space between two spring contact fingers 53 and 54, the finger 53 being electrically connected to the live bar 44, and the finger 54 being connected to a lamp 55 included in the circuit.

Figure 24:
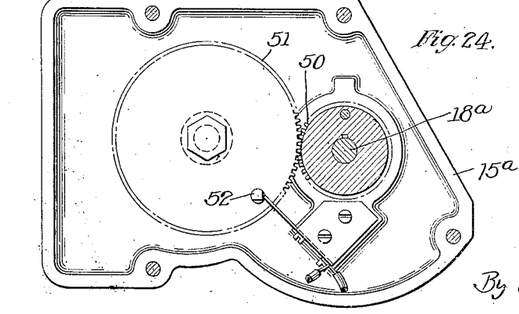

As shown in Fig. 24, the portion of the pin 52 which makes contact with the fingers 53 and 54 is reduced to an edge; and said edge engages the ends of said fingers. Thus relatively slight movement of the wheel 51 is sufficient to disengage the pin 52 from the contact fingers.

In every revolution of the grounded gear wheel 51, the pin 52 closes a circuit to ground, thus throwing out the high-speed drive and stopping the warper, and also closes a circuit through the lamp 55. The light indicates to the operator that the warper has stopped for the insertion of a lease, and not because of thread breakage. By the time the operator has inserted the lease and is ready to restart the warper at high speed, the rotation of the warp beam through the action of the low-speed drive has carried the edge of the pin 52 away from the ends of the contact springs 53 and 54, thus enabling the operator to throw the high-speed drive into operation.

As will be apparent to those skilled in the art, various constructional changes may be made without departing from the spirit and scope of the invention defined in the appended claims.

I claim as my invention:

1. A warper clock having, in combination, a screw, an indicator movable along the screw by the rotation of the latter, a graduated bar extending parallel with the screw, the indicator being arranged to travel along said bar, a stop block mounted on said bar for adjustment longitudinally thereof, said screw having a cut-away portion at one end, said bar having a longitudinal groove therein and a transverse groove communicating with the longitudinal groove, said stop block having a transverse groove communicating with the longitudinal groove in said bar, a projection on the indicator adapted to travel in said longitudinal groove and be confined by the walls thereof so as to prevent disengagement of the indicator from the screw, said projection dropping into the transverse groove in said bar when the indicator reaches the cut-away portion of said screw, said projection being arranged to slide along one edge of said bar and enter the transverse groove in the stop block, a contact bar extending along said screw, said indicator being arranged to engage said contact bar when the indicator reaches the cut-away portion of said screw, and a contact on said indicator arranged to engage said contact bar while said projection is on the edge of the graduated bar.

2. A warper having, in combination, a screw, an electric contact movable along the screw by the rotation of the latter, a stop block mounted for adjustment longitudinally of the screw, said screw having a cut-away portion at one end, a part having a longitudinal groove therein and a transverse groove communicating with the longitudinal groove, said stop block having a transverse groove communicating with the longitudinal groove in said part, a projection on the contact adapted to travel in said longitudinal groove and be confined by the walls thereof so as to prevent disengagement of the contact from the screw, said projection dropping into the transverse groove in said part when the indicator reaches the cut-away portion of said screw, said projection being arranged to slide along one edge of said part and enter the transverse groove in the stop block, a contact bar extending along the screw, the first mentioned contact being arranged to engage said contact bar when the first mentioned contact reaches the cut-away portion of the screw, and a contact connected to the first contact and arranged to engage said contact bar while said projection is on the edge of said part.

3. A warper clock having, in combination, a screw, an indicator movable along the screw by the rotation of the latter, a graduated bar extending parallel with the screw, the indicator being arranged to travel along said bar, a stop block mounted on said bar for adjustment longitudinally thereof, said screw having a cut-away portion at one end, said bar having a longitudinal groove therein and a transverse groove communicating with the longitudinal groove, said stop block having a transverse groove communicating with a longitudinal groove which registers with the longitudinal groove in said bar, said stop block having an inclined guide portion communicating with the transverse groove in said stop block, a projection on the indicator adapted to travel in said longitudinal grooves and be confined by the walls thereof so as to prevent disengagement of the indicator from the screw, said projection dropping into the transverse groove in said bar when the indicator reaches the cut-away portion of said screw, said projection being arranged to slide along one edge of said bar and be guided by said inclined portion into the transverse groove in the stop block.

4. A warper clock having, in combination, a screw, an indicator movable along the screw by the rotation of the latter, a graduated bar extending parallel with the screw, the indicator being arranged to travel along said bar, a stop block mounted on said bar for adjustment longitudinally thereof, said screw having a cut-away portion at one end, said bar having a longitudinal groove therein and a transverse groove communicating with the longitudinal groove, said stop block having a transverse groove communicating with the longitudinal groove in said bar, a projection on the indicator adapted to travel in said longitudinal groove and be confined by the walls thereof so as to prevent disengagement of the indicator from the screw, said projection dropping into the transverse groove in said bar when the indicator reaches the cut-away portion of said screw, said projection being arranged to slide along one edge of said bar and enter the transverse groove in the stop block.

5. A warper clock having, in combination, a screw, an indicator movable along the screw by the rotation of the latter, a graduated bar extending parallel with the screw, the indicator being arranged to travel along said bar, a stop block mounted on said bar for adjustment longitudinally thereof, said bar having a longitudinal groove therein and a transverse groove communicating with the longitudinal groove, said stop block having a transverse groove communicating with the longitudinal groove in said bar, a projection on the indicator adapted to travel in said longitudinal groove and be confined by the walls thereof so as to prevent disengagement of the indicator from the screw, said projection being manually withdrawable from said longitudinal grooves, said projection dropping into the transverse groove in said bar when the indicator reaches the end of said screw, said projection being arranged to slide along one edge of said bar and enter the transverse groove in the stop block.

6. A warper clock having, in combination, a screw, an indicator arranged to be moved along the screw by the rotation of the latter, and a part having a groove therein extending parallel with the screw, said indicator having a part lying in said groove when the indicator is in engagement with the screw, the wall of said groove preventing disengagement of the indicator from the screw, said groove being of such length that the part on the indicator drops out of said groove when the indicator drops off the end of the screw.

7. A warper clock having, in combination, a screw, an electric contact arranged to be moved along the screw by the rotation of the latter, and a part having a groove therein extending parallel with the screw, said contact having a part lying in said groove when the contact is in engagement with the screw, the wall of said groove preventing disengagement of the contact from the screw.

8. A warper clock having, in combination, an electric contact, means to cause the contact to move synchronously with the warper, a stop to determine the initial position of the contact, said contact being arranged for disengagement from the contact-moving means, and means normally acting to prevent the warper from being started before the contact has been placed in engagement with said stop and in engagement with said contact-moving means.

9. A warper clock having, in combination, a screw, an indicator arranged to be moved along the screw by the rotation of the latter, a graduated part over which the indicator is arranged to travel, a stop for the indicator, said stop being adjustable along said graduated part, said indicator being arranged for disengagement from the screw, and means normally acting to prevent the warper from being started before the indicator has been placed in engagement with said stop and engagement with the screw.

10. A warper clock having, in combination, an indicator, means to cause the indicator to move synchronously with the warper, a graduated part over which the indicator is arranged to move, a stop for the indicator, said stop being adjustable along said graduated part, said indicator being arranged for disengagement from the indicator-moving means, and means normally acting to prevent the warper from being started before the indicator has been placed in engagement with said stop and in engagement with said indicator-moving means.

11. A warper clock having, in combination, a screw, an indicator arranged to be moved along the screw by the rotation of the latter, a graduated part over which the indicator is arranged to travel, said indicator being arranged for disengagement from the screw, and means normally acting to prevent the warper from being started before the indicator has been placed in engagement with the screw, said preventing means being automatically disabled when the indicator is placed in engagement with the screw.

12. A warper clock having, in combination, an indicator, means to cause the indicator to move synchronously with the warper, a graduated part over which the indicator is arranged to move, said indicator being arranged for disengagement from the indicator-moving means, and means normally acting to prevent the warper from being started before the indicator has been placed in engagement with said indicator-moving means, said preventing means being automatically disabled when the indicator is placed in engagement with the indicator-moving means.

13. A warper clock having, in combination, a screw, an electric contact arranged to be moved along the screw by the rotation of the latter, a stop to determine the initial position of said contact, and means normally acting to prevent the contact from being manually shifted along the screw after the contact has commenced to travel away from the stop and before the contact reaches the end of its travel.

14. A warper clock having, in combination, an electric contact arranged to move synchronously with the warper, a stop to determine the initial position of said contact, and means normally acting to prevent the contact from being manually shifted after the contact has commenced to travel away from the stop and before the contact reaches the end of its travel.

15. A warper clock having, in combination, an electric contact, means to cause the contact to travel synchronously with the warper, said contact being arranged for disengagement from the contact-moving means, and means normally acting to prevent the warper from being started before the contact has been placed in engagement with the contact-moving means.

16. A warper clock having, in combination, a screw, a graduated bar and a guide rod extending parallel with the screw, a slide pivoted upon and movable along the guide rod and having a tooth adapted to engage said screw, an indicator finger on said slide arranged to move along said graduated bar, a stop block mounted on said bar for adjustment longitudinally thereof, said bar having a longitudinal groove therein, said slide having a projection adapted to slide in said groove and also slidable along the top of the bar after said tooth has been withdrawn from engagement with the screw, said stop block being shaped to allow said projection to pass from the top of the bar to said groove, an electric contact bar also extending along the screw, and a spring contact on said slide arranged to engage said contact bar while said projection is being moved along the top of the bar, said slide being arranged to drop into engagement with said contact bar when said tooth reaches the end of the screw.

17. A warper clock having, in combination, a screw, a graduated bar and a guide rod extending parallel with the screw, the screw being between the bar and the rod, a slide pivoted upon and movable along the guide rod and having a tooth adapted to engage said screw, gravity holding said tooth against the screw, an indicator finger on said slide arranged to move along said graduated bar, a stop block for said finger mounted on said bar for adjustment longitudinally thereof, and an electric contact located in position to be engaged by said slide in the falling movement of the latter when said tooth passes off the end of the screw.

18. A warper clock having, in combination, a screw, a bar and a guide rod extending parallel with the screw, an indicator pivoted upon and slidable along the guide rod and movable along the screw by the rotation of the latter, said indicator having a part adapted to slide along said bar and be held by said bar so as to prevent pivotal movement of said indicator which would disengage the indicator from the screw, and also slidable along the top of the bar after the indicator has reached the end of the screw and has been pivotally moved to place said part on top of the bar, and a stop block mounted on said bar for adjustment longitudinally thereof, said stop block being shaped to allow said part to pass from the top of the bar into engagement with said bar to prevent pivotal movement of the indicator.

19. A warper clock having, in combination, a screw, a bar and a guide rod extending parallel with the screw, and an indicator pivoted upon and slidable along the guide rod and movable along the screw by the rotation of the latter, said graduated bar having a longitudinal groove therein, said indicator having a part adapted to slide in said groove and held by the walls of said groove so as to prevent pivotal movement of said indicator which would disengage the indicator from the screw.

20. A warper clock having, in combination, a screw, a bar and a guide rod extending parallel with the screw, and an indicator pivoted upon and slidable along the guide rod and movable along the screw by the rotation of the latter and normally engaged with said bar so as to be held against pivotal movement on said guide rod in the direction to disengage the indicator from the screw.

21. A warper clock having, in combination, a screw, a bar extending parallel with the screw, and an indicator movable along the screw by the rotation of the latter and normally engaged with said bar so as to be held against disengagement from the screw.

22. A warper clock having, in combination, a screw, a contact bar extending parallel with the screw, a slide having a tooth adapted to engage said screw, a stop to determine the starting position of the slide, said stop being mounted for adjustment parallel with the screw, said slide being arranged to engage said contact bar when said tooth reaches the end of the screw, and a contact on said slide arranged to slide in contact with said contact bar while the slide is being returned into contact with the stop.

23. A warper clock having, in combination, a screw, a bar extending parallel with the screw, a slide movable along the screw and having a tooth adapted to engage said screw, said bar having a longitudinal groove therein, said slide having a projection adapted to slide in said groove and also slidable along the top of the bar after said tooth has been withdrawn from engagement with the screw, an electric contact bar also extending along the screw, and a contact on said slide arranged to engage said contact bar while said projection is being moved along the top of the bar, said slide being arranged to engage said contact bar when said tooth reaches the end of the screw.

24. A warper clock having, in combination, a screw, an indicator movable along the screw by the rotation of the latter, said indicator being arranged to close an electric circuit to stop the warper, said indicator also being arranged to keep said circuit closed while the indicator is being returned to starting position.

25. A warper clock having, in combination, a screw, an indicator movable along the screw by the rotation of the latter, an electric contact bar extending along the screw, said indicator being arranged to move into engagement with said contact bar and thus close an electric circuit to stop the warper when the indicator reaches the end of the screw and also being arranged to keep said circuit closed while the indicator is being returned to starting position.

26. A warper clock having, in combination, a screw, an indicator movable along the screw by the rotation of the latter, said indicator being arranged to stop the warper when the indicator reaches the end of the screw and also being arranged to keep the warper stopped while the indicator is being returned to its starting position.

27. A warper clock having, in combination, a screw, a graduated bar extending parallel with the screw, and an indicator movable along the screw by the rotation of the latter and arranged to travel along said bar, said bar having a longitudinal groove therein, said indicator having a part adapted to slide in said groove and also slidable along the top of the bar after the indicator has been withdrawn from engagement with the screw, and a stop block mounted for adjustment longitudinally of the screw, said stop block being shaped to allow said part to pass from the top of the graduated bar to said groove.

28. A warper clock having, in combination, a screw, an indicator movable along the screw by the rotation of the latter, a graduated bar extending parallel with the screw, the indicator being arranged to travel along said bar, a stop block mounted on said bar for adjustment longitudinally thereof, said indicator being liftable out of engagement with the screw so that the indicator may be moved back to starting position alongside the stop block, and means normally preventing the indicator from being replaced in engagement with the screw after the indicator has been lifted out of engagement with the screw and while intermediate the end of the screw and said stop block.

29. A warper clock having, in combination, a screw, an indicator movable along the screw by the rotation of the latter, a stop mounted for adjustment longitudinally of the screw, said indicator being withdrawable from engagement with the screw so that the indicator may be moved back to starting position alongside the stop, and means normally preventing the indicator from being replaced in engagement with the screw after the indicator has been withdrawn from engagement with the screw and while intermediate the end of the screw and said stop.

In testimony whereof, I have hereunto affixed my signature.

BURT A. PETERSON.